United States Patent
Hopfauf et al.

(10) Patent No.: US 11,821,541 B2
(45) Date of Patent: Nov. 21, 2023

(54) VALVE FOR A SANITARY FAUCET HAVING A DIAPHRAGM VALVE AND AN ADJUSTABLE CONTROL ROD

(71) Applicant: Grohe AG, Hemer (DE)

(72) Inventors: Harry Hopfauf, Soest (DE); Janik Buchmüller, Schwerte (DE)

(73) Assignee: GROHE AG, Hemer (DE)

(\*) Notice: Subject to any disclaimer, the term of this patent is extended or adjusted under 35 U.S.C. 154(b) by 0 days.

(21) Appl. No.: 17/771,961

(22) PCT Filed: Sep. 25, 2020

(86) PCT No.: PCT/EP2020/076958
§ 371 (c)(1),
(2) Date: Apr. 26, 2022

(87) PCT Pub. No.: WO2021/083592
PCT Pub. Date: May 6, 2021

(65) Prior Publication Data
US 2022/0373098 A1 Nov. 24, 2022

(30) Foreign Application Priority Data
Oct. 28, 2019 (DE) .................... 10 2019 129 059.7

(51) Int. Cl.
*F16K 31/385* (2006.01)
*F16K 7/17* (2006.01)

(52) U.S. Cl.
CPC ............ *F16K 31/3855* (2013.01); *F16K 7/17* (2013.01)

(58) Field of Classification Search
CPC .. F16K 31/3855; F16K 7/17; Y10T 137/9464; E03C 1/0403
See application file for complete search history.

(56) References Cited

U.S. PATENT DOCUMENTS

| 4,099,703 A | * | 7/1978 | Lush ......................... F16K 1/52 251/285 |
| 9,458,948 B2 | * | 10/2016 | Ehmig ..................... F16K 7/126 |
| 2009/0146090 A1 | * | 6/2009 | Hashimoto ....... F16K 31/52408 251/25 |

FOREIGN PATENT DOCUMENTS

| EP | 1 903 267 | 3/2008 |
| GB | 2 388 888 | 11/2003 |
| JP | 2006-22638 | 1/2006 |

OTHER PUBLICATIONS

International Search Report dated Dec. 2, 2020 in International (PCT) Application No. PCT/EP2020/076958.

\* cited by examiner

*Primary Examiner* — Daphne M Barry
(74) *Attorney, Agent, or Firm* — Wenderoth, Lind & Ponack, L.L.P.

(57) ABSTRACT

A valve (1) for a sanitary faucet, comprising:
 a liquid duct (2) having at least one inlet (3) and at least one outlet (4) for a liquid;
 a diaphragm valve (5) having a diaphragm (6) and a counterpressure chamber (7) connected to the at least one inlet (3); and
 a control rod (8) for controlling the diaphragm valve (5), wherein a push button (9) can be used to adjust the control rod (8) between a closed position, in which the diaphragm valve (5) is closed, and an open position (10), in which the diaphragm valve (5) is at least partially open, wherein a rotary handle (11) can be used to adjust the control rod (8) in the open position (10) between a minimum flow position (12), in which a minimum flow rate of the liquid flows through the at least one outlet (4), and a maximum flow position (13), in which a maximum flow rate of the liquid flows through the at least one outlet (4), and wherein the minimum flow position (12) of the control rod (8) can be variably adjusted.

6 Claims, 2 Drawing Sheets

VALVE FOR A SANITARY FAUCET HAVING A DIAPHRAGM VALVE AND AN ADJUSTABLE CONTROL ROD

This invention relates to a valve for a sanitary faucet. Such sanitary faucets are used to provide a liquid on demand, for instance at showers, bathtubs, sinks or washbasins.

For instance, valves for a sanitary faucet are known from EP 1 903 267 A1, the diaphragm valve of which sanitary faucet can be controlled by a pilot valve. Such valves are characterized in particular by low actuating forces. The pilot valve includes a control rod that can be adjusted between a closed position and an open position by a push button. When the control rod is in the open position, the diaphragm valve is at least partially open. In the open position, a rotary handle can also be used to adjust the control rod between a minimum flow position and a maximum flow position to control a volumetric flow of the liquid via the diaphragm valve. The opening and closing of the valve on the one hand and the setting of a desired volume flow of the liquid on the other hand can in that way be controlled independently of each other via the push button and the rotary handle. This has the advantage that a previously set, desired volume flow of the liquid does not have to be reset when the valve is opened and closed. A disadvantage of these valves, however, is that their proper operation depends on a supply pressure of the liquid at which the liquid is routed to the valve. However, the liquid supply pressure may vary depending on the installation location. If the supply pressure is too low, the diaphragm valve will not open or a diaphragm of the diaphragm valve will start to oscillate when the control rod is in the minimum flow position. For this reason, the control rod in the known valves is designed in such a way that, in the minimum flow position of the control rod, the diaphragm of the diaphragm valve is open sufficiently wide to avoid the disadvantages mentioned above even at low supply pressures of the liquid. However, this increases a minimum flow rate of liquid through the diaphragm valve when the control rod is in the minimum flow position. This may increase the water consumption of the sanitary faucet.

Further, this reduces an adjustable range of the flow rate of the liquid or a difference between the minimum flow rate and a maximum flow rate of the liquid.

Therefore the invention addresses the problem of solving at least a part of the issues described with reference to the prior art and, in particular, of proposing a valve, which can be adapted to varying supply pressures of the liquid.

This problem is solved by a valve according to the features of the independent claim. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A valve for a sanitary faucet having at least the components listed below contributes to solving the problem:
- a liquid duct having at least one inlet and at least one outlet for a liquid;
- a diaphragm valve having a diaphragm and a counterpressure chamber connected to the at least one inlet; and
- a control rod for controlling the diaphragm valve, wherein a push button can be used to adjust the control rod between a closed position, in which the diaphragm valve is closed, and an open position, in which the diaphragm valve is at least partially open, wherein a rotary handle can be used to adjust the control rod in the open position between a minimum flow position, in which a minimum flow rate of the liquid flows through the at least one outlet, and a maximum flow position, in which a maximum flow rate of the liquid flows through the at least one outlet, and wherein the minimum flow position of the control rod can be variably adjusted.

A hose and/or pipe, for instance, can be used to connect the valve to a sanitary faucet. Sanitary faucets are used to provide a liquid on demand, in particular at showers, bathtubs, sinks or washbasins.

The valve comprises a liquid duct having at least one inlet, which can be used to connect the valve to a liquid source, for instance public liquid mains. The liquid, for instance water, flowing in via the at least one inlet can be fed to a diaphragm valve of the valve through the liquid duct, which may be a plastic die-cast component, for instance. To this end, an inlet channel and/or an inlet chamber can be formed in the liquid duct. The diaphragm valve can be used to close or open an outlet in the liquid duct. In an installed state of the valve, the outlet can lead to the sanitary faucet. The diaphragm valve comprises a diaphragm and a counterpressure chamber connected to the at least one inlet. The liquid can flow into the counterpressure chamber of the diaphragm valve from the inlet channel and/or the inlet chamber of the liquid duct via a drilled compensation hole in the diaphragm of the diaphragm valve and/or other components of the valve.

Furthermore, the diaphragm valve can be controlled by a control rod. For this purpose, the control rod extends in particular into a control channel of the diaphragm. The control channel connects the counterpressure chamber to the outlet and extends in particular through the diaphragm. In particular, an annular seal is arranged in the control channel, for instance in the form of an O-ring. The control rod extends in particular through the seal. In addition, the control rod has a seal section and a recess section. In the area of the seal section, a first diameter of the control rod is in particular (largely) constant along a longitudinal axis of the control rod. In the area of the recess section, the control rod has in particular a second diameter that is smaller than the first diameter of the control rod in the seal section. A push button can be used to move the control rod between a closed position, in which the diaphragm valve is closed, and an open position, in which the diaphragm valve is at least partially open. In particular, the control rod can be moved between the closed position and the open position by repeatedly pressing the push button. To this end, the control rod is moved in the control channel, in particular in the direction of its longitudinal axis. In the closed position of the control rod, the seal of the control channel contacts the seal section of the control rod such that no liquid can flow from the counterpressure chamber via the control channel into the outlet. As a result, the liquid has the same liquid pressure on both sides of the diaphragm. Because the diaphragm delimits the counterpressure chamber with a larger area than the inlet channel and/or inlet chamber of the liquid duct, the force on the diaphragm resulting from the liquid pressure of the liquid in the counterpressure chamber is greater than the force resulting from the liquid pressure of the liquid in the inlet channel and/or inlet chamber. In this way, the diaphragm is pressed onto a valve seat closing the diaphragm valve.

In the open position of the control rod, the control rod in particular is moved at least partially out of the control channel such that the seal of the control channel is located in the area of the recess section of the control rod. This forms an annular gap in the control channel through which liquid can flow from the counterpressure chamber into the outlet. This causes the liquid pressure in the counterpressure chamber to drop, lifting the diaphragm off the valve seat until the pressure above and below the diaphragm is compensated. In the open position of the control rod, the diaphragm valve is at least partially open. In order for the diaphragm valve to open, the liquid pressure in the counterpressure chamber has to drop sufficiently sharply due to the steady state established between the liquid flowing in through the compensation orifice and the liquid flowing out of the counterpressure chamber through the control channel. For this purpose, the control channel can be larger or have a larger diameter than the drilled compensation hole.

In the open position, a rotary handle can be used to move the control rod between a minimum flow position, in which a minimum flow rate of the liquid flows through the at least one outlet, and a maximum flow position, in which a maximum flow rate of the liquid flows through the at least one outlet. Turning the rotary handle results in the adjustment between the minimum flow position and the maximum flow position of the control rod. For this purpose, the rotary handle can, for instance, be rotated at an angle (in particular about the longitudinal axis of the control rod) of between 45° and 360°, preferably (approximately) 180°. The push button is at least partially disposed in the rotary handle and/or can be moved relative to the rotary handle in the direction of the longitudinal axis of the control rod. When the control rod is adjusted, the control rod moves in particular in the direction of its longitudinal axis in the control channel. During the motion of the control rod between the minimum flow position and the maximum flow position, the seal of the control channel is located in particular in the area of the recess section of the control rod, to let liquid flow from the counterpressure chamber through the control channel into the outlet. Owing to the pressure of the liquid above and below the diaphragm, the diaphragm follows the motion of the control rod. In the minimum flow position, the control rod is moved so far in the direction of the diaphragm or in the control channel of the diaphragm that the diaphragm is lifted from the valve seat by a minimum of travel. In the maximum flow position, the control rod is moved so far in the direction of the diaphragm or in the control channel of the diaphragm that the diaphragm is lifted from the valve seat by a maximum of travel. Therefore, in the maximum flow position of the control rod, the diaphragm valve is fully open.

The minimum flow position of the control rod can be variably adjusted. In particular, this can mean that the position of the control rod, which the control rod reaches in the minimum flow position, can be variably adjusted. Furthermore, this can mean that the position of the control rod in the minimum flow position can be variably adjusted while the rotary position of the rotary handle remains unchanged. For this purpose, in the minimum flow position the control rod can be moved in the direction of its longitudinal axis relative to the rotary handle and/or the push button. Furthermore, the minimum flow position of the control rod can be adaptable to the supply pressure of the liquid. For this purpose, the minimum flow position of the control rod is set in such a way that the diaphragm valve opens reliably in the minimum flow position of the control rod, that no oscillation of the diaphragm occurs and that the diaphragm is only minimally lifted from the valve seat. This further maximizes the range of flow rate of the liquid that can be adjusted via the rotary handle, or the difference between the minimum flow rate and the maximum flow rate of the liquid. In addition, the influence of component tolerances affecting the position of the control rod can be compensated.

The minimum flow position of the control rod can be variably adjusted without actuating the push button or the rotary knob. In particular, the minimum flow position of the control rod can be variably adjusted without actuating the push button and/or the rotary knob.

The minimum flow position of the control rod can be variably adjusted during the operation of the valve. For this purpose, the control rod is accessible or can be made accessible, in particular during operation of the valve.

The control rod can be connected to a slide block, which can be used to move the control rod between the minimum flow position and the maximum flow position when the rotary handle is turned. To set the minimum flow position of the control rod, a mounting location of the slide block at the control rod can be moved, in particular in the direction of the longitudinal axis of the control rod.

The control rod can be connected to the slide block via a first thread. The first thread can be used in particular to change the mounting location of the slide block on the control rod. For this purpose, the control rod can be in particular rotated relative to the slide block.

The slide block can be connected to the rotary handle via a second thread. In particular, the second thread can be formed directly or indirectly between the slide block and the rotary handle. In particular, the second thread can also be formed between the slide block and a threaded sleeve that is connected to the rotary handle for co-rotation. In particular, this can mean that the threaded sleeve can be rotated with the rotary handle. The rotation of the rotary handle or the threaded sleeve causes the slide block with the control rod to be adjusted in the direction of the longitudinal axis of the control rod relative to the rotary handle or the threaded sleeve due to the second thread.

The first thread may have a greater thread pitch than the second thread.

The first thread and the second thread can have different directions of rotation. For instance, the first thread may be a left-hand thread and the second thread may be a right-hand thread, or vice versa.

To control the diaphragm valve, a control channel of the diaphragm connecting the counterpressure chamber to the at least one outlet can be closed or at least partially opened by the control rod.

The invention and the technical environment are explained in more detail below with reference to the figures. It should be noted that the figures show a particularly preferred embodiment variant of the invention, but the invention is not limited thereto. The same reference signs are used for the same components in the figures. In an exemplary and schematic manner FIG. 1 shows a longitudinal section of a valve;

Figure 1:
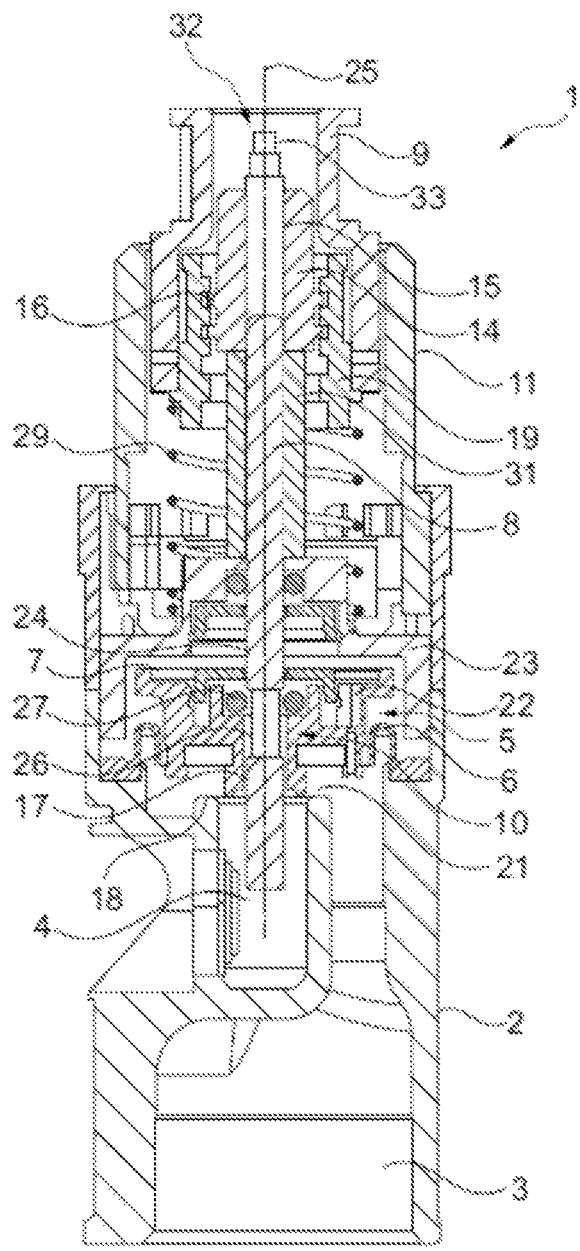

FIG. 1 shows a longitudinal section of a valve 1. The valve 1 comprises a liquid duct 2 having an inlet 3 for a liquid. A liquid line (not shown here), which can be used to supply liquid with a supply pressure to the valve 1, can be connected to the inlet 3. Furthermore, the valve 1 has a diaphragm valve 5 having a diaphragm 6. The diaphragm 6 is at least partially elastic and mounted in the liquid duct 2 in a movable manner. The liquid flows from the inlet 3 of the liquid duct 2 into an annular inlet chamber 21 and from there through a compensation channel 22 of the diaphragm 6 into a counterpressure chamber 7. The counterpressure chamber 7 is located on a side of the diaphragm 6 opposite from the inlet chamber 21 and at least partially delimited by a limiting element 23. A control rod 8 can be used to control the diaphragm valve 5. For this purpose, the control rod 8 extends through a control channel 17 of the diaphragm 8, which connects the counterpressure chamber 7 to an outlet 4. Further, the control rod 8 has a seal section 24 having a substantially constant diameter along a longitudinal axis 25 of the control rod 8 and an annular recess section 26 having a smaller diameter than the seal section 24. The control rod 8 can be moved in a vertical direction (i.e. in parallel to its longitudinal axis 25) in the control channel 17 of the diaphragm 6. When the control rod 8 is in a closed position (i.e., further down in the vertical direction than shown in FIG. 1), the seal section 24 of the control rod 8 is in the region of a seal 27 (formed here as an O-ring) of the diaphragm 6, preventing any liquid from flowing out of the counterpressure chamber 7 through the control channel 17 into the outlet 4. When the counterpressure chamber 7 is closed, the liquid pressure in the first inlet chamber 21 and in the counterpressure chamber 7 is identical. Because the diaphragm 4 delimits the counterpressure chamber 7 with a larger area than the inlet chamber 21, the force on the diaphragm 6 resulting from the liquid pressure of the liquid in the counterpressure chamber 7 is greater than the force resulting from the liquid pressure of the liquid in the inlet chamber 21. In this way, the diaphragm 6 is pressed onto an annular valve seat 18 preventing any liquid from flowing out from the inlet 3 via the outlet 4. The valve seat 18 is formed at a longitudinal end of the outlet 4 and at the liquid duct 2.

A push button 9 can be used to move the control rod 8 in parallel to its longitudinal axis 25 between the closed position described above and an open position 10 shown in FIG. 1. When a user of the valve 1 presses the push button 9 down, the control rod 8 moves downwards with the push button 9 until the control rod 8 reaches the closed position, in which the diaphragm valve 5 is closed. By pressing the push button 9 again, the control rod 8 moves upwards in the vertical direction with the push button 9 until the control rod 8 reaches the opening position 10 shown here. In the open position 10, the recess section 26 of the control rod 8 is located in the area of the seal 27 of the diaphragm 6, permitting liquid to flow from the counterpressure chamber 7 via the control channel 17 into the outlet 4. This causes the liquid pressure in the counterpressure chamber 7 to drop, lifting the diaphragm 6 off the valve seat 18. In the open state of the diaphragm 6, the liquid flows from the inlet chamber 21 via the valve seat 18 directly into the outlet 4. The outlet 4 can be used to route the liquid to a sanitary faucet (not shown here).

Figure 2:
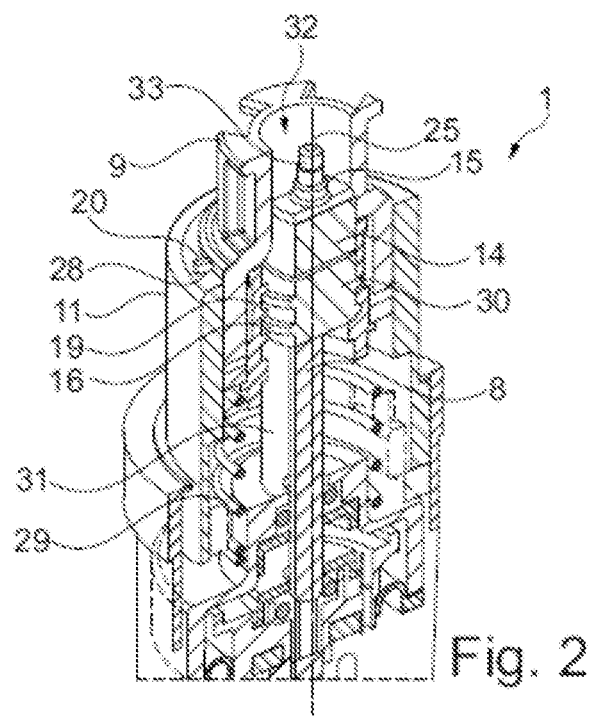
FIG. 2 shows a perspective view of the valve.
Figure 3:
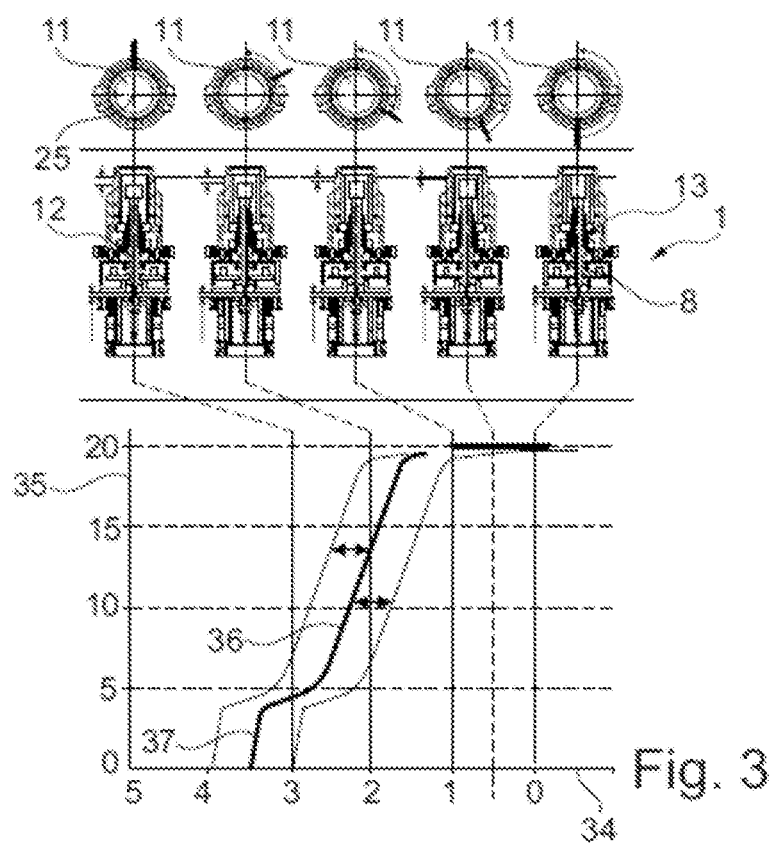
FIG. 3 shows a diagram showing flow rates of the valve between a minimum flow position and a maximum flow position of the valve.

In the opening position 10 shown here, a rotary handle 11 is used to move the control rod 8 between a minimum flow position 12 (cf. FIG. 3) and a maximum flow position 13 (see also FIG. 3). In this case, a user can rotate the rotary handle 11 by 180 ° to adjust the control rod 8 between the minimum flow position 12 and the maximum flow position 13. In the minimum flow position 12, the rotary handle 11 is used to move the control rod 8 downwards in the vertical direction to such an extent that the diaphragm valve 5 is still partially open or the diaphragm 6 is still (slightly) lifted off the valve seat 18 resulting in a minimum flow rate of the liquid flowing through the outlet 4. In the maximum flow position 13, the rotary handle 11 is used to move the control rod 8 upwards in the vertical direction until the diaphragm valve 5 is fully open or the diaphragm 6 is completely lifted off the valve seat 18 resulting in a maximum flow rate of the liquid flowing through the outlet 4. To move the control rod 8 between the minimum flow position 12 and the maximum flow position 13, the push button 9 is used to connect the rotary handle 11 to a threaded sleeve 19 for co-rotation. To this end, the push button 9 shown in FIG. 2 has projections 20 extending in parallel to the longitudinal axis 25 of the control rod 8, which projections are guided by grooves 28 of the rotary handle 11, which grooves also extend in parallel to the longitudinal axis 25 of the rotary handle 11. Matching projections and grooves are also formed between the push button 9 and the threaded sleeve 19, but these are not visible in FIGS. 1 and 2. Turning the rotary handle 11 about the longitudinal axis 25 results in the push button 9 and the threaded sleeve 19 turning as well. At the same time, however, the push button 9 and the threaded sleeve 19 can be moved relative to the rotary handle 11 in the vertical downward direction against a spring force of a spring 29 and in the vertical upward direction against the spring force of the spring 29, respectively. A first thread 15 is used to connect the control rod 8 to a slide block 14. The slide block 14 in turn is connected to the threaded sleeve 19 by a second thread 16 and has two opposing flat retaining surfaces 30 that rest against a retaining element 31, preventing the threaded sleeve 19 from rotating. Turning the rotary handle 11 rotates the threaded sleeve 19, i.e., the slide block 14 is moved with the control rod 8 in parallel to the longitudinal axis 25.

For a variable setting or adjustment of the minimum flow position 12 (cf. FIG. 3) of the control rod 8, the control rod 8 can be rotated relative to the slide block 14 such that the first thread 15 can be used to move the control rod 8 in the direction of its longitudinal axis 25 relative to the slide block 14. In this way, the minimum flow position 12 can be adapted to the supply pressure of the liquid, such that the minimum flow rate of the liquid in the minimum flow position 12 of the control rod 8 reaches a desired value. To rotate the control rod 8 relative to the slide block 14, the control rod 8 may have a force application contour 33 at its longitudinal end 32, for instance in the manner of a screw head. The rotary handle 11 and/or the force application contour 33 may be hidden by an aperture not shown here. It is attached to the rotary handle 11 in a detachable manner to keep the force application contour 33 accessible even during operation of the valve 1.

FIG. 3 shows a diagram, in which a position of the control rod 8 of the valve 1 is plotted on an X axis 34 and the corresponding flow rate of the liquid in L/min (liters per minute) through the outlet 4 of the valve 1 is plotted on a Y axis 35. In position 5 on the X-axis 34, the control rod 8 is in the closed position. In positions 3 to 0 on the X-axis 34, the control rod 8 is in the open position 10 shown in FIG. 1, in which the diaphragm valve 5 is at least partially open. In position 3 on the X-axis 34, the rotary handle 11 is also rotated by 0°, i.e., the control rod 8 is in the minimum flow position 12. In position 2 on the X-axis 34, the rotary handle 11 is rotated by 60°, in position 1 on the X-axis 34 it is rotated by 125°, and in position 0 on the X-axis 34 it is rotated by 180°. In position 0 on the X-axis 34, the rotary handle 11 is fully rotated (clockwise) about the longitudinal axis 25 such that the control rod 8 is in the maximum flow position 13. A graph 36 illustrates the progression of the flow rate as a function of the position of the control rod 8. The graph 36 can be moved to the left and right by adjusting the minimum flow position 12 of control rod 8. The setting of the minimum flow position 12 of the control rod 8 is preferably done in such a way that a lower region 37 of the graph 36 with a high slope is not located in the region of the minimum flow position 12, i.e. not in position 3 on the X axis 34, but to the left thereof.

This invention permits the valve to be adapted to different supply pressures.

LIST OF REFERENCE NUMERALS

1 Valve
2 Liquid duct
3 Inlet
4 Outlet
5 Diaphragm valve
6 Diaphragm
7 Counterpressure chamber
8 Control rod
9 Push button
10 Opening position
11 Rotary handle
12 Minimum flow position
13 Maximum flow position
14 Link block
15 First thread
16 Second thread
17 Control channel
18 Valve seat
19 Threaded sleeve
20 Projection
21 Inlet chamber
22 Compensation channel
23 Limiting element
24 Seal section
25 longitudinal axis
26 Recess section
27 Seal
28 Groove
29 Spring
30 Retaining surface
31 Retaining element
32 Longitudinal end
33 Force application contour
34 X axis
35 Y axis
36 Graph
37 Area

The invention claimed is:

1. A valve (1) for a sanitary faucet, comprising:
a liquid duct (2) having at least one inlet (3) and at least one outlet (4) for a liquid;
a diaphragm valve (5) having a diaphragm (6) and a counterpressure chamber (7) connected to the at least one inlet (3); and
a control rod (8) for controlling the diaphragm valve (5), wherein a push button (9) can be used to adjust the control rod (8) between a closed position, in which the diaphragm valve (5) is closed, and an open position (10), in which the diaphragm valve (5) is at least partially open, wherein a rotary handle (11) can be used to adjust the control rod (8) in the open position (10) between a minimum flow position (12), in which a minimum flow rate of the liquid flows through the at least one outlet (4), and a maximum flow position (13), in which a maximum flow rate of the liquid flows through the at least one outlet (4), wherein the minimum flow position (12) of the control rod (8) can be variably adjusted, wherein the control rod (8) can be connected to a slide block (14), which can be used to move the control rod (8) between the minimum flow position (12) and the maximum flow position (13) when the rotary handle (11) is turned, wherein a first thread (15) is used to connect the control rod (8) to the slide block (14), wherein a second thread (16) is used to connect the slide block (14) to the rotary handle (11), and wherein the first thread (15) has a greater thread pitch than the second thread (16).

2. The valve (1) according to claim 1, wherein the minimum flow position (12) of the control rod (8) can be variably adjusted without actuating the push button (9) or without actuating the rotary handle (11).

3. The valve (1) according to claim 1, wherein the minimum flow position (12) of the control rod (8) can be variably adjusted during operation of the valve (1).

4. The valve (1) according to claim 1, wherein the minimum flow position (12) of the control rod (8) can be variably adjusted by changing a position of the control rod (8) relative to the sliding block (14).

5. The valve (1) according to claim 1, wherein the first thread (15) and the second thread (16) have different directions of rotation.

6. The valve (1) according to claim 1, wherein to control the diaphragm valve (5), a control channel (17) of the diaphragm (6) connecting the counterpressure chamber (7) to the at least one outlet (4) can be closed or at least partially opened by the control rod (8).

* * * * *